March 9, 1937.  C. M. BRYANT  2,072,865
PROCESS OF WASHING FRUIT
Filed May 7, 1928
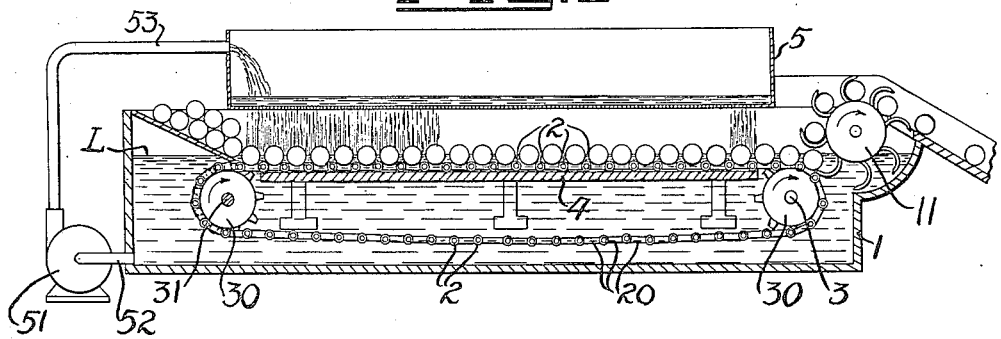
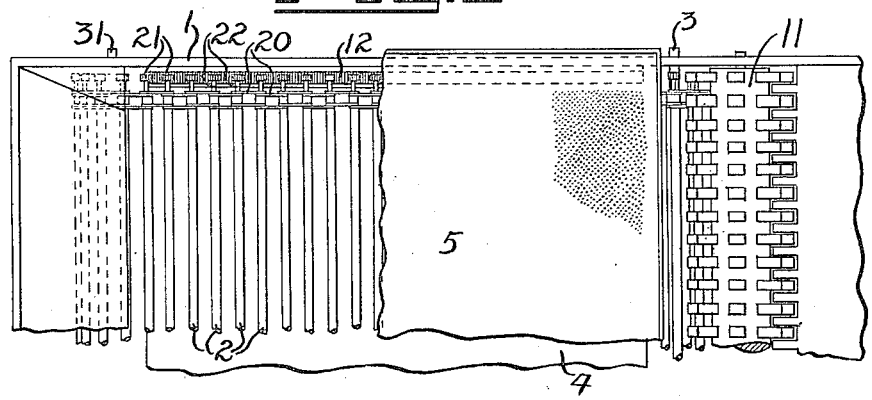
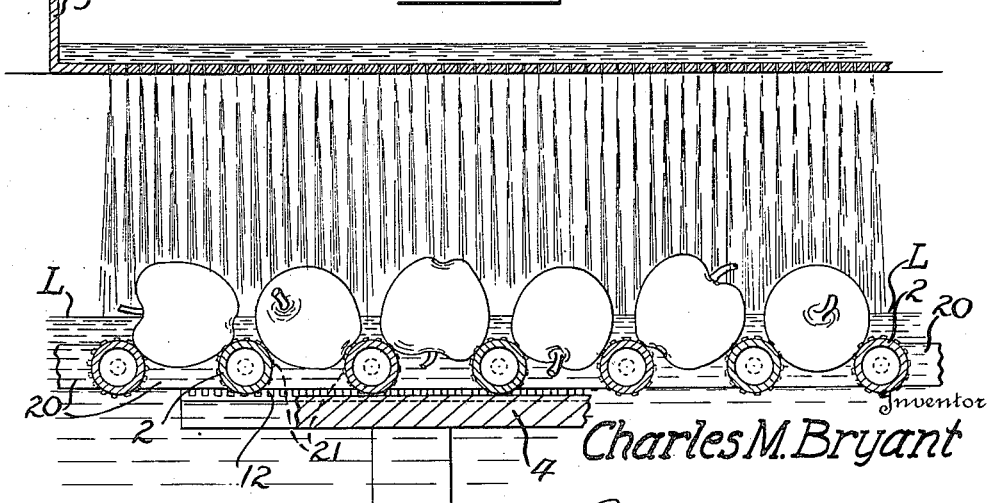
Inventor
Charles M. Bryant
By Reynolds & Reynolds
Attorneys Patented Mar. 9, 1937

2,072,865

UNITED STATES PATENT OFFICE 2,072,865

PROCESS OF WASHING FRUIT

Charles M. Bryant, Seattle, Wash.

Application May 7, 1928, Serial No. 275,910

6 Claims. (Cl. 99—103)

My invention relates to the washing of fruits, such as apples, to remove from them any poisonous or injurious spray residue, such as lead arsenate, which has been employed to protect the fruit and trees from the ravages of insects.

The general object of my invention is to provide a process of washing such fruits, whereby the fruit may be more thoroughly cleansed of the residue, with less damage, actual or potential, to the fruit, and at less expense to the operator, than by any other known method.

More specifically, it is my object to provide a process having among its advantages: the lessening of damage to the fruit by reason of acid burns, or by destruction of the protective wax, inducing formation of decay focii, and by reason of penetration of the washing solution through the calyx end; the lessening of expense to the operator, through speeding up the washing process, requiring fewer washing machines and less floor space therefor, by cutting down the percentage of acid or alkali in the solution, and by the employment of less heat in the process; and finally, the more complete removal of the residue, to come within set standards or tolerances.

Most specifically, it is an object of my invention to provide a process of washing such fruits, whereby the indentations of the stem and calyx ends of the fruit are more thoroughly cleansed than by any other known process.

My process is not a submersion process, for that is too lengthy, and has proven injurious to the apples; it is not a spray process, for that alone is ineffective; and it is not solely an agitation process, for that has serious faults. My process is a combination of the best features of the several processes, and one which will more effectively, quickly, and cheaply produce the desired results, which are, mainly, to reduce the deposits of spray residue to a point where they will not be injurious to health, that is to say, to a point lower than the domestic and export tolerances permitted by official regulations, all without injury to the apples.

With these and other objects in mind, my invention comprises the novel process and the novel steps therein, all as diagrammatically shown in the accompanying drawing, and as will be more particularly described in this specification, and defined by the claims terminating the same. In the accompanying drawing I have shown, in purely diagrammatic character, an apparatus which is capable of carrying out my improved process.

Figure 1 is a representative longitudinal section through such a machine.

Figure 2 is a plan view of such a machine with the spray tank and certain handling or elevating apparatus omitted.

Figure 3 is a view on a larger scale, of apples being washed according to my process.

I have selected apples as a representative fruit, marketed in large quantities, and will explain my process as relating to apples, although it must be kept in mind that it will be found applicable to other fruits which are sprayed, and from which the residue must be removed. This poisonous residue is deposited as a film over the skin of the apple by the evaporation of the spray, and while that which adheres to the convex outer surface can be removed without too much difficulty by known processes, that which lies in the depressions of the stem and calyx ends is removed only with the greatest difficulty, with the certainty of positive injury to the fruit if removed, and with the probability, if the fruit is protected from actual injury, that there will still be too much residue left to bring the fruit within the official tolerances, which are .01 grain of arsenious oxide per pound of apples, the world tolerance, and .025 grain per pound, last year's tolerance, or .020 grain per pound, the domestic tolerance for the current year. In fact, the usual processes which are commercially feasible and economical do not eliminate sufficient of the residue.

This film of residue lies mostly outside of the protective wax film on the skin of the apple, and processes heretofore employed commercially would, if persisted in long enough to remove the residue in proper quantities from the stem and calyx depressions, remove the wax from the convex surfaces, leaving the apple open to attack by the spores of decay. Ordinarily, such processes are not carried this far, but in all cases the tendency is to remove the wax. Heating of the washing solution, whether acid or alkali in character, while it aids in the solution of the film of residue, in far greater measure accomplishes the removal of the wax. The application of heat over any extended period tends to ripen the apples. If it is attempted to assist the solution of the residue by spraying the washing solution (especially acid, which is preferable because when heated it attacks the wax more slowly than the alkali) under pressure, there is danger of damaging the fruit by producing the condition known as "arsenic burn".

Agitation, or relative movement between the apple and the washing solution, has been attempted, but without sufficiently satisfactory results. In theory, a film of the washing solution, in contact with the layer of residue, will become saturated with the product of the reaction between the chemicals dissolved in the washing solution (as hydrochloric acid) and in the layer itself (lead arsenate) before the layer of residue is penetrated. It may even become locally supersaturated, and deposit a film of less soluble lead chloride, and in such case the removal of the lead arsenate presents an even greater problem. The previous processes appear to work out in this manner in practice, where there is little or no relative agitation between the fruit and the washing solution. Even with agitation of the fruit, or with the creation of a current in the solution, while the saturated solution is continuously replaced by fresher solution, the terminal depressions of the apple collect so much of the solution, holding it as in a dead pocket, wherein the solution remains locally saturated, so that agitation has not, in practice, solved the problem of cleansing the depressions. Frequently 90% of the undissolved residue is found, after washing, in these depressions, the aggregate area of which is a very small proportion of the total area of the apple's surface.

There are three usually practiced commercial methods of washing such fruits. One which is employed chiefly by farmers, or by those to whom the time element is unimportant, or those who do not wish to invest in expensive equipment, and where the volume and quantity of fruit to be washed is not large, is to dip the apples, contained in their lug boxes, into a vat of washing solution. This solution commonly is either a solution of borax in water, or of hydrochloric acid in water. Here the boxes of apples are allowed to remain until the solution has had time to dissolve the film of arsenate of lead from all parts of the apples. This, however, is a rather lengthy process, in view of the fact that there is no agitation of either the apples or of the liquid, and it has been found that the solution penetrates the calyx end of the apples, to their detriment. This is especially true if the apples are subjected to hydrostatic pressure.

Another process frequently employed on a commercial scale is that which may be termed the spray process, in which apples are conveyed through a chamber in which they are exposed to a mist from dispersed jets of the washing solution, directed toward them from all sides. This mist, however, settles upon the apples, and when once settled upon the surface, there is no relative agitation between the apples and the solution, and the time element again enters, for the locally saturated solution prevents ready solution of the film of arsenate of lead. Furthermore, without any agitation of the apples, portions of the apples which are pressed closely together will not receive the spray and will not be affected.

A further method of washing apples is to traverse the apples through a chamber, in which they are subjected to jets of the solution, tumbling the apples over in the atmosphere of the chamber. This is more effective, inasmuch as the relative motion between the apples and the jets will serve to expose all surfaces of the apples to the solution, but the difficulty is always to cleanse the depressions of the stem and calyx ends. If the apples do not happen to tumble over in such a position that a jet strikes either of these depressions, the depressions will not be cleansed. Should an apple carried through either of the latter two processes receive sufficient of the washing solution in one of these depressions or the other, the depression will be filled, and thereafter there will be no agitation between the liquid therein and the surface of the apple within the depression. Furthermore, it is always the case, that if one of these depressions is uppermost, the other is downward and is less likely to receive any spray, also, if the apples in their course do not happen to present a depression to several such jets, there is little likelihood of removing sufficient of the residue. Then, too, there is always a tendency, due to the impact of jets at any considerable pressure, to drive liquid or arsenic deposits into the calyx end, or into abrasions, to the ultimate detriment of the fruit.

The immersion method has been found reasonably satisfactory, where there is no objection to the time required, and where the apples are to be consumed promptly. The jet method is reasonably satisfactory for so much of the surface as is exposed to the jet. I propose, then, to subject the apple to a combination of the jet and immersion methods, and to modify these methods in several particulars; in that the apples are immersed so short a time, and to so shallow a depth as to prevent any harm by penetration; in that the jets are so spaced and arranged that it is certain that one or more jets will strike and enter either depression which may come uppermost; in that the jets, being of low pressure, yet with a solid core, will have insufficient impact effect to penetrate the skin; in that any given area, whether within a depression or not, is certain to have rapid movement relative to a body or stream of liquid, recurring many times during the short time occupied by the process, and each area substantially the same number of times as any other area; in that there is agitation of the liquid in the depressions, even though no jet strikes them, and in that the strength of the solution may be lessened, the temperatures reduced, and the time consumed lessened.

According to my process, the apples are moved through a vat, which contains the washing liquid, filled to such a level that the apples are approximately half submerged in the liquid. I have found that certain types of apples, when agitated and moved through a liquid under such circumstances, will roll over and over on their own axes through the stem and calyx ends, while other types of apples, under like conditions, will tumble end over end. In the case of those apples which roll on their own axes, the depressions at the stem and calyx ends will be half submerged and half out of the liquid, but, as the apple is constantly rotating, the submerged portion will come out of the liquid, and the unsubmerged portion will be dipped thereinto, causing constant relative agitation between the liquid and the apple, as well in the stem and calyx ends as over the outer surface. For those apples which tumble end over end, there will be somewhat like agitation, but there will be a tendency for the liquid to collect in dead pockets in the two depressions, without sufficient agitation, and therefore with these apples the effect by immersion will not be so great as with those which rotate on their own axes.

To accommodate such apples, I provide a series of jets, closely spaced, so that whenever a depression is uppermost, it will be struck by at least one of these jets, and this jet, having a core of small size relative to the area of the depression, sweeping into a depression, will create a current through the depression and will sweep the dissolved arsenate of lead from the depression and cause a continuous flow of fresh solution to the depression. The action is one of solution and removal of the locally saturated water, rather than one of mechanical impact. Such jets may be spaced a maximum of one and one quarter inches apart, (though preferably much closer) and as the depressions of the ordinary market apples are considerably more than this distance across, it will be evident that the apple cannot tumble end over end without the depressions being continuously in contact with one or more of such jets. Any liquid in such pockets, then, has the benefit of constant agitation.

The ideal size of the jet is in the neighborhood of the diameter of the stem of the apple. Jets up to ¼ inch diameter will sufficiently enter the depressions and sweep them out, though a considerably larger jet might tend to build up a dead space, of no agitation, in the bottom of the depressions. A jet smaller than the diameter of the stem will be too greatly dispersed by striking the stem, of too little volume to be effective, and jets of small size will too easily clog up, with low pressure. The desideratum is to have a jet of a size which will penetrate, as a solid core, to the bottom of the end depressions, without building up a cone of dead solvent, which deflects the live jet, and prevents its penetration, and yet not so small as to be dispersed as mist. A sheet of water up to ¼ inch thick will perhaps not be as fully effective as single jets, since the water may not escape except before and behind the sheet, yet it is not to be understood that such a narrow sheet will not approximate the results obtained by single jets, hence the term "jet," as used herein, is to be understood as including sheets of liquid, and the diameters of the jets would, in such cases, be the thickness of such sheets. These jets or sheets need not and should not be of high pressure; a fall of three or four inches has been found sufficient. These jets should be so continuous as to form practically a continuous stream or core, rather than a dispersion as mist. If they, or at least their cores, are of the size of the stem, they will enter the pocket and will not form dead pressure areas of no agitation. I prefer, too, that these jets be so staggered in their area, that is to say, so arranged, that there is a jet for every one and one-fourth inch square, at least.

As will be seen in the drawing attached hereto, in which is illustrated a convenient form of apparatus for carrying out the process which I have described, a tank 1 contains an endless conveyor, consisting of the links 20 and the roller 2. The links 20 are carried upon sprocket wheels 30, mounted upon shafts 3 and 31, one of these shafts, as 3, being the driving shaft, and driven from any suitable source of power (not shown). To maintain the proper level of the upper run of the conveyor, with respect to the liquid level, indicated at L, at table 4 may be supported within the tank and the rollers 2 may roll over this table 4.

In addition to traversing the apples, which rest upon and between the rollers 2, they are tumbled over by means which cause the rollers 2 to revolve rapidly upon their own axes. Such means are suggested by the gear pinions 21, carried upon shafts 22, which form part of each roller 2, which gears 21 are enmeshed with a fixed rack 12, supported within the tank 1.

Above the greater portion of the tank is supported a tank 5, which receives the washing liquid and which has numerous perforations, through which issue jets of the liquid. These perforations are spaced preferably not to exceed one and one-quarter inches apart, and I prefer that they be spaced no more than one half inch apart in any direction. They should be staggered transversely and longitudinally. A pump 51 is shown as drawing liquid through an outlet pipe 52 from the lower portion of the vat 1, and delivering it through a delivery pipe 53 to the tank 5. It will be understood that the apples may be supplied to and taken from the vat 1 in any suitable manner, and I have illustrated the rotary elevator 11 for removing them.

It should be mentioned that in addition to supporting the fruit at the proper degree of submergence within the solution, advancing the fruit therethrough, and positively tumbling or rolling the fruit over and over as it advances, the rollers 2 are caused to function in still another way by their being so proportioned and spaced that they project upwards into the spaces between the fruit and thus hold the pieces of fruit separated from each other and thus enable the washing solution to make contact with all surfaces of the fruit at all times.

Further than this, the rollers 2 have still another function which contributes toward efficient cleansing of portions of the surface of the fruit which have not been satisfactorily cleansed by earlier existing methods. As the rollers 2 rotate, they tend to carry a thin current of solution around with them, due to the friction set-up between the rollers and the solution in contact with them. Similarly, the fruit carried by the rollers rotates in a direction opposite that of the rollers, and each piece of fruit also tends to carry a thin current of solution with it. These two currents impinge upon each other, thus setting up small eddy currents within the body of solution, and it appears that this relatively highly agitated solution enters the stem and calyx depressions and penetrates all the way to the bottoms thereof, thus becoming effective to agitate the solution in contact with parts of the fruit where it is most difficult to secure agitation.

By the process just described, those apples which tumble end over end are insured of being cleansed by the spray, and those which rotate on their own axes are only submerged sufficiently to insure that there is proper agitation within the stem and calyx indentations. They may be rotated at as high a speed as sixty-five to seventy revolutions of the apple per minute, although I prefer that they be rotated at from twenty-five to fifty-five revolutions per minute, for the reason that the increased speed of solution above the latter speed is negligible. Agitation is required to dissolve the residue readily, but the rate of solution of this residue is not directly proportional to the rate of agitation.

Not only does my process more quickly cleanse the cheeks of the apples, at lower temperatures and with weaker solutions, but I have determined that by the application of this process, and in less time than with any other known process, apples may be cleansed below the world tolerance, which is .01 grain of arsenious oxide per pound of apples, even with a weaker acid or alkali solution than has been used heretofore, and at lower temperatures than were required by other processes heretofore in use. It had been found difficult, with reasonable economy, to reduce the amount of residue below the domestic tolerance, formerly .025 grain per pound, now .020, but tests of my improved process have shown less than .008 grain (as low as .004) of arsenious oxide per pound of apples, with apples washed under conditions analogous to those obtaining in the operation of other processes.

What I claim as my invention is:

1. A fruit washing process for removal of spray residue which comprises substantially half submerging fruit in chemical spray residue dissolving washing solution, rotating the several pieces of fruit, and spraying the fruit with streams of said washing solution of diameter substantially equal to that of the average diameter of the stems of said fruit and freely falling under gravity head a distance less than six inches, said streams being spaced apart a distance less than the average diameter of the stem and calyx depression of said fruit.

2. In a fruit washing machine, a solution tank, means for supporting fruit partly submerged in solution within said tank and for rotating the fruit therein, a tank having a multiplicity of perforations therein and disposed above said supporting means at substantially the minimum elevation at which fruit moving on said supporting means will clear said perforated tank, whereby streams issuing from said perforations will fall freely upon said fruit under a minimum gravity head, said perforations being of such diameter that each of the streams issuing therefrom is of a diameter substantially equal to the average diameter of the stems of said fruit, and means for supplying solution to said perforated tank.

3. A process of washing spray residue from the surface of apples having a stem and calyx depression which comprises washing the said calyx depression and the said stem depression with a plurality of substantially spaced continuous solid streams of a liquid chemical washing solution of a size substantially equal to the average diameter of the stems of the apples treated and of an impact force of the order of less than six inches of hydrostatic pressure, relatively moving the fruit and streams, so that each of the streams will be adapted to flush the bottom of the said stem depression and will not be driven through the calyx openings of the said apple into the core.

4. A process of washing spray residue from the surface of apples having a stem and calyx depression which comprises partially submerging the apple in a body of chemical wash solution and washing the said calyx depression and the said stem depression with a plurality of substantially spaced continuous solid streams of a liquid chemical washing solution of a size substantially equal to the average diameter of the stems of the apples treated and of an impact force of the order of less than six inches of hydrostatic pressure, relatively moving the fruit and streams, so that each of the streams will be adapted to flush the bottom of the said stem depression and will not be driven through the calyx openings of the said apple into the core thereof and recycling the said chemical wash solution.

5. A process of washing spray residue from the stem and calyx depressions of apples which comprises subjecting the said depressions alternately to the action of a plurality of substantially spaced continuous solid streams of chemical washing solution of a size substantially equal to the average diameter of the stems of the apples treated, the maximum spacing apart of the streams being less than the largest diameter of the depressions and rotating the apple so that the solution will flush the bottom of the depressions, the impact force of the said solid streams being of the order of less than six inches of hydrostatic pressure, so that upon rotation the said solid streams will flush the bottom of the stem depression and will not be driven through the calyx openings of the fruit into the core thereof.

6. A process of washing spray residue from the surface of apples having a stem and calyx depression which comprises washing the said calyx depression and the said stem depression with a plurality of substantially spaced continuous solid streams of a liquid chemical washing solution of a size substantially equal to the average diameter of the stems of the apples treated and of an impact force of the order of three to four inches of hydrostatic pressure, relatively moving the fruit and streams, so that each of the streams will be adapted to flush the bottom of the said stem depression and will not be driven through the calyx openings of the said apple into the core.

CHARLES M. BRYANT.